(12) United States Patent
Leslie et al.

(10) Patent No.: US 8,589,386 B2
(45) Date of Patent: Nov. 19, 2013

(54) CARD VIEW FOR PROJECT RESOURCE SEARCH RESULTS

(75) Inventors: Victoria Leslie, Roseville, CA (US); Jeffrey Thomas Colvard, Wilkinsburg, PA (US); Darryl Watson, Pleasanton, CA (US); Brian Cohen, Clayton, CA (US); Eric Wienke, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/438,372

(22) Filed: Apr. 3, 2012

(65) Prior Publication Data
US 2013/0262444 A1 Oct. 3, 2013

(51) Int. Cl.
*G06F 17/30* (2006.01)

(52) U.S. Cl.
USPC ........................................................ 707/722

(58) Field of Classification Search
USPC .................. 707/2, 722; 706/45; 715/738
See application file for complete search history.

(56) References Cited

U.S. PATENT DOCUMENTS

| 6,810,402 | B2* | 10/2004 | Bates et al. ............................ 1/1 |
| 7,587,377 | B2* | 9/2009 | Ren .................................. 706/45 |
| 8,135,612 | B1* | 3/2012 | Scudder ........................ 705/7.14 |
| 2006/0089868 | A1* | 4/2006 | Griller et al. .................... 705/10 |
| 2010/0031157 | A1* | 2/2010 | Neer et al. ..................... 715/738 |

OTHER PUBLICATIONS

NetSuite Open Air—obtained at www.openair.com; Apr. 3, 2012; 1 page.
Professional Services Automation Software for Projector PSA—obtained at www.projectorPSA.com; Apr. 3, 2012; 1 page.

* cited by examiner

*Primary Examiner* — Etienne Leroux
(74) *Attorney, Agent, or Firm* — Trellis IP Law Group, PC

(57) ABSTRACT

A system and method for facilitating displaying search results in an enterprise computing environment. An example method includes determining results of a computer based search in response to a resource request; displaying the results via one or more cards, wherein each of the one or more cards includes information pertaining to a particular search result; and illustrating, in a card, at least a portion of the information via one or more graphics. In a specific embodiment, the one or more graphics include one or more visually coded graphics, including an indicator illustrating a qualification score associated with a human resource, and an indicator illustrating an availability score associated with the human resource.

14 Claims, 6 Drawing Sheets

FIG. 4

CARD VIEW FOR PROJECT RESOURCE SEARCH RESULTS

BACKGROUND

The present application relates to software and more specifically to user interface designs and methods for facilitating displaying and interacting with search results.

Software for facilitating displaying and interacting with search results is employed in various demanding applications, including display of general web-based search results and Enterprise Resource Planning (ERP) database query results. Such applications often demand user interface display mechanisms and data organization techniques that enable efficient and rapid access to relevant information.

Efficient mechanisms for efficiently ascertaining desired information from search results are particularly important in ERP applications, such as project management and resource management applications, where inefficiencies can inhibit rapid informed decision making and reduce business productivity.

In an example enterprise environment, a given project may require certain resources, such as human resources (e.g. personnel) to meet certain needs. A resource manager may employ resource management software to ascertain available resources to meet those needs. In response to a resource query, also called a resource request, the resource management software may provide specialized search results based on search criteria included in the resource request. The search criteria may set forth certain requirements, e.g., pertaining to personnel availability, qualifications, proficiencies, and so on, in accordance with project needs.

Conventionally, resource search results are presented via a table view. However, conventional table views often lack effective features for facilitating rapid review and selection of the best available resource for a given project need. Hence, search results presented in a conventional table may be difficult to rapidly decipher, thereby reducing resource manager productivity.

SUMMARY

An example method facilitates displaying search results in an enterprise computing environment. The example method includes determining results of a computer based search in response to a resource request; displaying the results via one or more cards, wherein each of the one or more cards includes information pertaining to a particular search result; and illustrating, in a card, at least a portion of the information via one or more graphics. In some embodiments, each card corresponds to a person and provides information on the corresponding person within the card. This can allow faster selection and comparison of people such as in matching a person to a position, choosing a person's card's metrics that best matches one's own metrics, etc.

In a specific embodiment, the one or more graphics include one or more visually coded graphics. The one or more visually coded graphics may include color coded graphics. Examples of color coded graphics include an indicator illustrating a qualification score associated with a resource, and an indicator illustrating an availability score associated with a resource. An example availability indicator includes plural sections, wherein each section corresponds to a particular time interval (e.g., a week), and wherein each section is visually coded to indicate an availability score corresponding the section.

In the specific example embodiment, the resource request includes a request for one or more human resources. The method further includes providing a first user option to sort displayed cards according to one or more metrics included in the information. Examples of metrics usable to sort the cards include qualification scores, available capacity scores, overall scores, and so on. An overall score may incorporate values of a qualification score and an available capacity score.

A second user option enables a user to filter the results corresponding to the displayed cards by selectively dragging one or more slider bars corresponding to one or more metrics, wherein the one or more metrics describe one or more resources included among the results. A user may specify, via the one or more slider bars, a range of values for a metric. Displayed results are then adjusted based on the range of values.

Another user option enables a user to perform an action on a card, such as adding a card or associated resource to a list of resources, such as a shortlist. Another example action includes comparing plural results, i.e., cards or resources represented thereby. Another user option enables accessing additional details (called drilling down) not shown in a card, by selecting a user interface control, such as a hyperlink, included in the card.

Hence, certain embodiment discussed herein may facilitate efficiently displaying and interacting with search results displayed in response to a resource request by organizing the results in cards with graphics. User options for sorting, filtering, ranking, and assigning displayed cards may offer users enhanced control and flexibility over how and what data is displayed, thereby potentially enhancing work efficiency. Use of cards and accompanying graphics and functionality discussed herein may facilitate rapid search, review, and selection of resources to meet the needs of a given project or task, thereby overcoming shortcomings with use of conventional text-based tables for displaying search results.

A further understanding of the nature and the advantages of particular embodiments disclosed herein may be realized by reference of the remaining portions of the specification and the attached drawings.

BRIEF DESCRIPTION OF THE DRAWINGS

Figure 4:
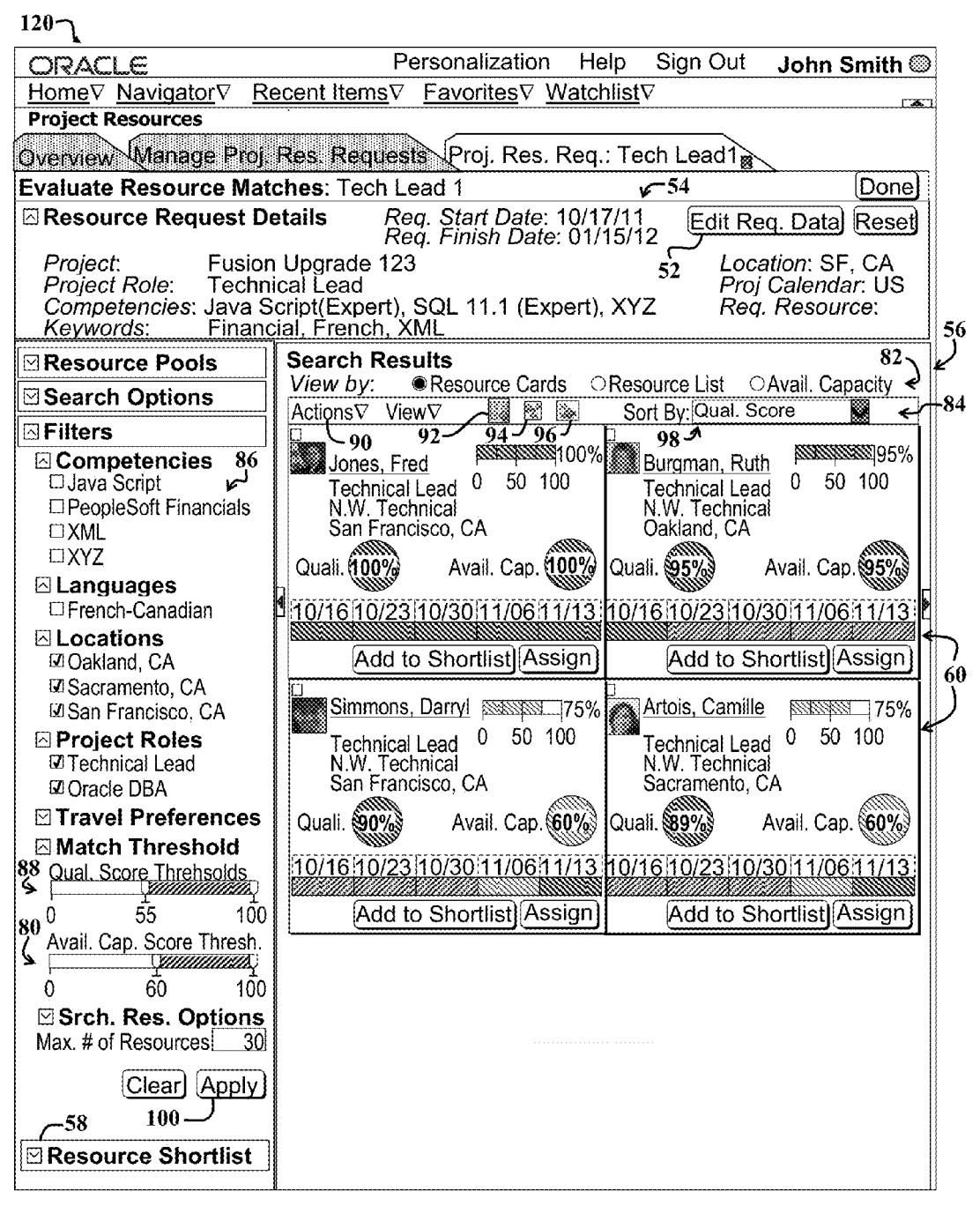

FIG. 4 is a second example user interface display screen adapted for use with the system of FIG. 1 and illustrating example search results.

DETAILED DESCRIPTION OF EMBODIMENTS

Although the description has been described with respect to particular embodiments thereof, these particular embodiments are merely illustrative, and not restrictive.

For example, while various embodiments herein are discussed with respect to user interface display screens suitable for desktop implementations, embodiments are not limited thereto. Various embodiments disclosed herein may be adapted for use with virtually any computer based display, including smart phone displays, tablet displays, and so on.

Furthermore, while various user interface controls, such as buttons, tabs, sliders, and so on, are shown, other types of user interface controls may be employed in addition to or instead of such controls, without departing from the scope of the present teachings.

For the purposes of the present discussion, a user interface control may be any displayed element or component of a user interface display screen, which is adapted to enable a user to provide input. Examples of user interface controls include buttons, drop down menus, menu items, hyperlinks, and so on.

For clarity, certain well-known components, such as hard drives, processors, operating systems, power supplies, and so on, have been omitted from the figures. However, those skilled in the art with access to the present teachings will know which components to implement and how to implement them to meet the needs of a given application.

Figure 1:
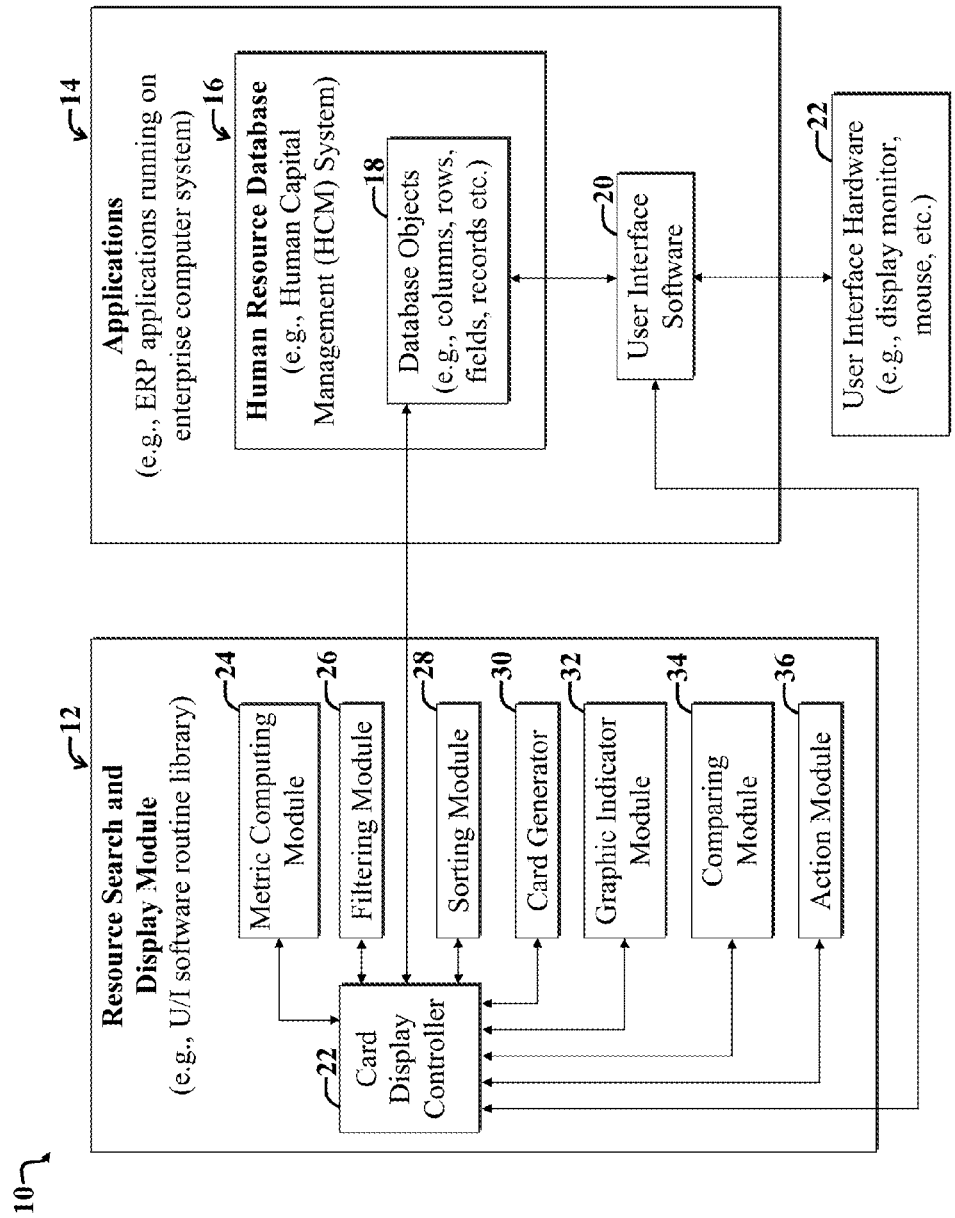
FIG. 1 is a diagram illustrating a first example embodiment of a system for facilitating conducting a resource query and displaying, organizing, and interacting with search results in response thereto.

FIG. 1 is a diagram illustrating a first example embodiment of a system 10 for facilitating conducting a resource query and displaying, organizing, and interacting with search results in response thereto. The example system 10 includes a resource search and display module 12 in communication with one or more software applications, such as Enterprise Resource Planning (ERP) software applications 14 (also simply called ERP applications).

The system 10 is considered part of an enterprise computing environment. For the purposes of the present discussion, an enterprise computing environment may be any computing environment used for a business or organization. A computing environment may be any collection of computing resources used to perform one or more tasks involving computer processing. An example enterprise computing environment includes various computing resources distributed across a network and may further include private and shared content on Intranet Web servers, databases, files on local hard discs or file servers, email systems, document management systems, portals, and so on.

For the purposes of the present discussion, ERP software may be any set of computer code that is adapted to facilitate managing resources of an organization. Example resources include Human Resources (HR) (e.g., enterprise personnel), financial resources, assets, employees, and so on, of an enterprise. The terms "ERP software" and "ERP application" may be employed interchangeably herein. However, an ERP application may include one or more ERP software modules or components, such as user interface software modules or components.

Enterprise personnel may be any person associated with an enterprise. An enterprise may be any organization of persons, such as a company, non-profit organization, university, government, and so on. Examples of enterprise personnel include employees, independent contractors, managers, investors, and so on.

Enterprise software applications, such as Customer Relationship Management (CRM), Business Intelligence (BI), Enterprise Resource Planning (ERP), and project management software, often include databases with various database objects, also called data objects or entities. A database object, also called a computing object herein, may be any collection of data, such as data pertaining to a particular financial account, asset, employee, contact, and so on. Examples of computing objects include, but are not limited to, records, tables, or other database entities corresponding to accounts receivables, products, employees, customers, business resources, and so on.

The example ERP applications 14 include a Human Resource (HR) database 16, which maintains various database objects 18. The database 16 communicates with user interface software 20, which communicates with user interface hardware 22. The user interface software 20 further communicates with the resource search and display module 12 via a card display controller 22 included in the resource search and display module 12.

The resource search and display module 12 further includes a metric computing module 24, a results filtering module 26, a results sorting module 28, a card generator 30, a graphic indicator module 32, a card comparing module 34, and an action module 36, all of which communicated with the card display controller 22. The card display controller 22 further communicates with the human resources database 16 and may facilitate conducting searches thereof.

In an example operative scenario, a resource manager employs the system 10 to conduct a search of human resources, such as enterprise personnel, whose characteristics, e.g., availability, qualifications, knowledge, experience, and so on, meet a particular set of criteria for a given project, task, or role. For the purposes of the present discussion, a human resource may be any person and accompanying knowledge and capabilities that may provide value to an organization, such as in the form of work or other effort.

The resource manager employs the user interface hardware 22 and software 20 to enter data (corresponding to search criteria), which characterizes a sought resource, where the entered data represents a resource request, also called a resource query. For the purposes of the present discussion, a resource request may be any database query seeking search results that contain data pertaining to a resource of an organization, such as a human resource. The resource request may include, for example, a specification or description of a resource sought to meet one or more needs or requirements of a project or task. In the present example embodiment, enterprise personnel, such as a resource manager, may enter (via the user interface hardware 22 and software 20) a resource request that includes one or more search criteria specifying sought characteristics of a human resource.

Data pertaining to the resource request is sent from the user interface software 20 to the card display controller 22, which conducts a search of the HR database 16. Alternatively, the user interface software 20 conducts the search of the HR database 16 based on the resource request. In either case, a set of one or more results is returned to the card display controller 22. The card display controller 22 then organizes the search results in various cards, i.e., electronic cards, wherein each card corresponds to a database object representing a result.

For the purposes of the present discussion, card, also called an electronic card, may be any collection of data and/or graphics presented in a region of a display screen. In the present example embodiment, the region is marked by a rectangular border, as discussed more fully below, but other shapes, such as circles, may be possible. Cards discussed herein may be tiled, cascaded, and so on. Similarly, cards may be characterized by different aspect ratios. For example, vertically or horizontally stretched cards may be horizontally or vertically arranged in rows or columns or may be placed in swim lanes, filmstrips, carousels, and so on, without departing from the scope of the present teachings.

The card display controller 22 may communicate with the metric weighting module 24 to determine, for example, how to calculate and/or weight values, i.e., metrics (in view of the resource request) to be displayed via one or more graphics. For example, the metric computing module 24 may include computer code for determining an availability score based on availability data and time data associated with a retrieved search result. For example a resource request may indicate that a resource is needed for six weeks starting one month from now. A resource that has more available time during the six week interval may be assigned a higher availability score.

Examples of other metrics that may be computed via the metric computing module 24 include qualifications scores, overall scores, and so on. The overall score may be computed, for example, based on a weighted combination, such as a weighted average, of the availability score and the qualifications score. In such a computation, the availability score or the calculation score may be weighted more or less than another in accordance with predetermined weights. In certain embodiments, the weights may be determined by a user of the system 10 via one or more controls provided in a user interface display screen, as may be displayed via a display monitor of the user interface hardware 22.

For the purposes of the present discussion, an overall score may be any number or metric that incorporates, in a calculation of the metric, plural metrics describing or characterizing a person or other resource. Examples of the plural metrics that may be incorporated into an overall score include a qualification score and an available capacity score (also called an availability score). A qualification score may be any metric or number that represents a measurement of a person's or other resource's qualifications for performing one or more tasks or roles indicated by a resource request. An available capacity score may be any metric or number the represents a measurement of a person's or other resource's availability for performing one or more tasks or roles indicated in a resource request. The resource request may include any collection of data describing one or more characteristics of a resource.

The filtering module 26 includes computer code for facilitating implementing filtering functions in response to user input to the user interface software 20. The filtering functions are used to filter search results, i.e., computing objects associated with resources matching a resource request, based on certain filtering criteria. Examples of filtering criteria include competencies of the resource, languages spoken by the resource, location, roles, travel preferences, qualification score ranges, availability capacity score ranges, and so on, as discussed more fully below.

The sorting module 28 includes computer code for facilitating sorting results, i.e., computing objects, such as database records, representing one or more resources meeting parameters set forth via a resource request. Results may be sorted, for example, by qualification score, available capacity score, overall score, and so on. Other sorting options, such as an option to sort by resource location proximity to a predetermined location, may be provided without departing from the scope of the present teachings. Furthermore, various sorting options are implementation specific and may be omitted or included in a particular implementation without departing from the scope of the present teachings.

The card generator 30 includes computer code for facilitating arranging data pertaining to retrieved resource results into electronic cards for display via the user interface software 20 and hardware 22.

The graphic indicator module 32 includes computer code for facilitating generating instructions for rendering graphics, such as graphical indicators presented in the cards, for display via the user interface software 20 and hardware 22.

For the purposes of the present discussion, a graphic, also called a visual display element or a graphical display element, may be any icon, visualization, window, dialog box, or other graphical or visual representation of a computing object or metric, where the visual representation may be presented on a display screen, projected, or otherwise displayed. Additional examples of graphics include color coded indicators, pictures, charts (or portions thereof), graphs, visualizations (e.g., sunburst visualizations), and so on.

In the present example embodiment, metrics, such as available capacity scores, qualification scores, and overall scores are illustrated via indicators. An indicator may be any graphic employed to illustrate a value or metric.

The comparing module 34 includes computer code for comparing resource results based on predetermined comparison parameters. Examples of comparison parameters include qualification scores, available capacity scores, and overall scores. For example, resource search results may be compared based on all data present in a given card. Results of the comparison may be displayed via a visualization, ranked list, chart, scatter plot, and so on. Exact methods for displaying results of a comparison operation are implementation specific and may vary depending upon the needs of a given implementation.

The action module 36 includes computer code for facilitating implementing an action pertaining to one or more resource results in response to user input provided via the user interface software 20 and hardware 22. Examples of actions include adding a resource result to a shortlist or other pool of resources; assigning a resource to a particular department or project, contacting a particular resource via email, and so on. The exact types of actions and associated user options provided by the system 10 are implementation specific and may vary accordingly.

The card display controller 22 includes software for interfacing the user interface software 20 with functionality provided by the modules 24-36. The card display controller 22 communicates with and incorporates inputs from the modules 24-36 for facilitating rendering a display of cards (representing search results, i.e., resources) via the user interface software 20 and hardware 22.

While various modules of the system 10 are shown as separate modules, certain modules may be incorporated into other modules or may be separated from other modules, without departing from the scope of the present teachings. For example, the resource search and display module 12 may be integrated with the user interface software 20, and the user interface software 20 may be incorporated as part of the HR database software 16.

In general, the various modules of the system 10, such as modules 22-36 of the resource search and display module 12, may be implemented via one or more computer functions, procedures, routine libraries, and so on, and the functionality may be distributed among resources of a network or consolidated into a single module, without departing from the scope of the present teachings. Similarly, the various modules of the system 10 may be implemented via a single computer or multiple computers distributed over a network, without departing from the scope of the present teachings.

Figure 2:
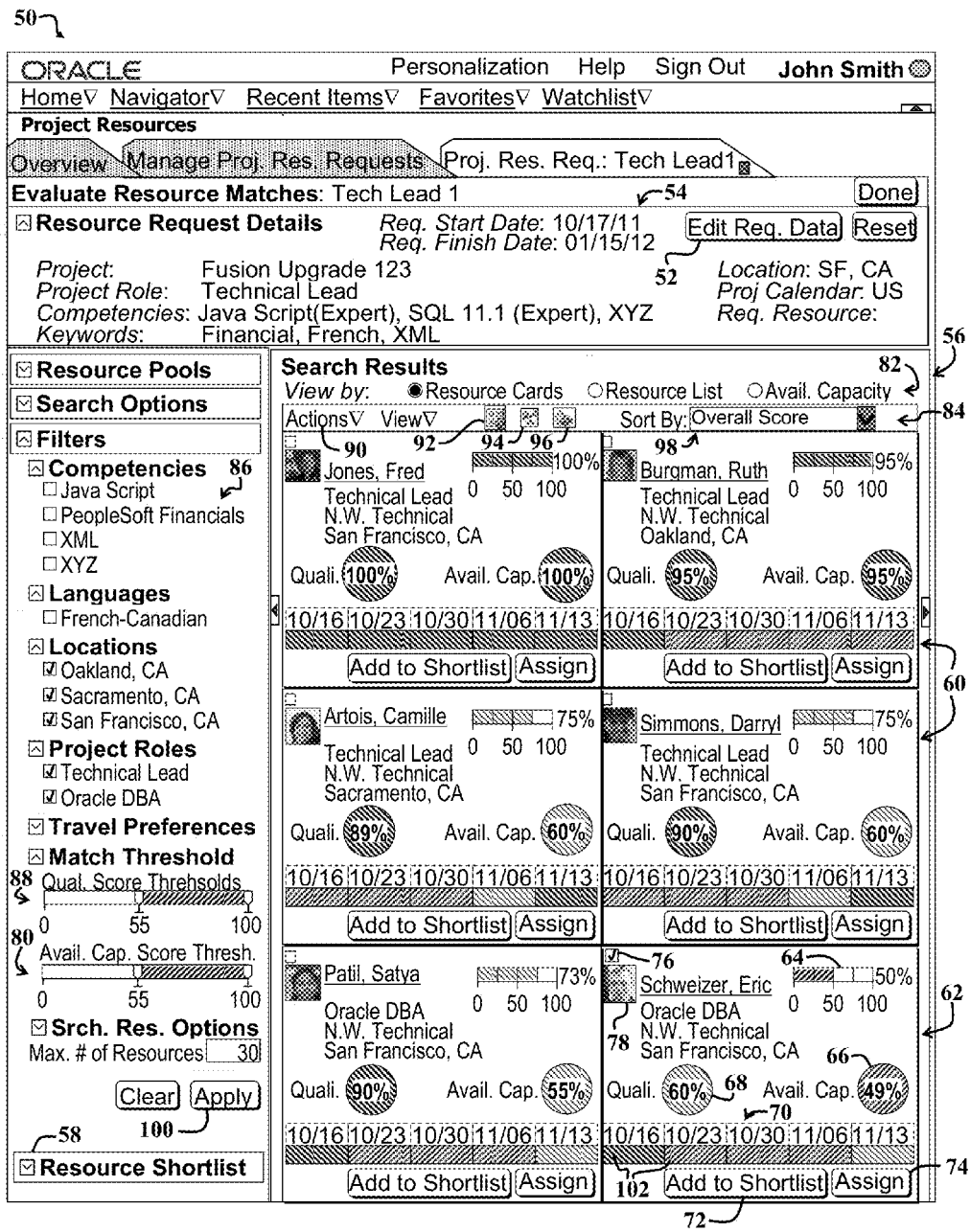
FIG. 2 is a first example user interface display screen adapted for use with the system of FIG. 1 and illustrating example search results.

FIG. 2 is a first example user interface display screen 50 illustrating example search results via various cards 60. The user interface display screen 50 includes a resource request section 54, which shows various details of an example resource request, such as project name, start date, finish date, location, competencies, and so on. User selection of an edit button 52 may open another window or dialog box, wherein a user may adjust the resource request details, also called query parameters, search criteria, or resource request criteria.

A search results section 56 includes various user interface controls 82, 84 for manipulating the displayed results, i.e., cards 60. For example, radio buttons 82 provide user options to display search results as cards, in a resource list (e.g., a table), or a listing according to available capacity of a person (human resource) associated with a card. Additional radio buttons may provide additional options, such as for cascading the cards 60 or for arranging the tiled cards 60 into a filmstrip view, without departing from the scope of the present teachings.

A tool bar 84 includes an actions drop down menu 90, a shortlist button 92, a compare button 94, an assign button 96, and a sort drop down list 98. The various user interface controls of the toolbar 84 may be used to manipulate selected cards. The cards 60 may be selected by checking a check box 76 included in each of the cards.

For example, to implement a compare operation comparing different cards, a user (e.g., resource manager) may first select each check box 76 for the cards that the user wishes to compare. The user may then select the compare button 94. Similarly, to add certain cards to a shortlist 58, a user may select cards by checking one or more of the check boxes 76, and then clicking the shortlist button 92.

Each card 60 also includes a person's name, picture 78, an overall score graphic 64, a qualifications graphic 68, an available capacity graphic 66, and a five-week availability indicator 70. The graphic indicators 64-70 are color coded or otherwise visually coded. For the purposes of the present discussion, a visually coded graphic or indicator may be any user interface element whose appearance has been adjusted in accordance with a scheme. For example, the color of a graphic may be adjusted to represent different ranges of values. Note that coding other than color coding may be employed. For example, shapes and/or sizes of graphics may be adjusted in accordance with different values or ranges of values associated with a given metric.

The five-week availability indicator 70 represents a graphic illustrating a resource's availability for a five week period. In the present example embodiment, the five week period corresponds to weeks within or near a start date and completion date of a project for which a resource is sought, as indicated in the example resource request details section 54.

The five-week availability indicator 70 includes plural sections 102 that correspond to weeks within a predetermined five week interval. Each section 102 is color coded or otherwise visually coded to convey or indicate an availability score corresponding the section. An available capacity score illustrated via the available capacity indicator 66 may represent a combination of the availability scores for the various sections 102 of the five-week availability indicator 70. Note that time periods other than five weeks, and partitions other than weekly partitions, may be employed in an availability indicator without departing from the scope of the present teachings. The five-week availability indicator 70 enables a resource manager to determine when a resource may become available and to make decisions accordingly.

Additional buttons 72, 74 for adding a card to a shortlist and for assigning a resource associated with a particular card to a project are also included. The search results section 56 may include different, additional, or fewer user interface controls than those shown, without departing from the scope of the present teachings.

An example filtering section 86 provides various user interface controls for filtering which cards 60 are displayed via the display section 56. For example, the displayed cards may be filtered by competencies, languages spoken, location, project role, travel preferences, and so on. Various filtering criteria may be employed by checking a box adjacent to the filtering criteria.

In the present example embodiment, checking a box next to an element of the filters 86 may cause inclusion of only resources characterized by the selected element. Selection of simultaneous filtering elements may cause inclusion of only resources characterized by one or more of the selected elements. Alternatively, only cards of resources that are described by both elements are then shown. Alternatively, selected filtering elements cause exclusion of cards corresponding to resources described by the selected filtering elements. Exact filter behaviors and provided filtering options are implementation specific and may vary between implementations, without departing from the scope of the present teachings.

In the present example embodiment, the filter section 86 further includes a qualification score slider 88 and an available capacity score slider 80. The sliders 88, 80 include movable tabs, also called bars, for enabling a user to specify ranges, also called regions, for a qualification score and an available capacity score. The regions represent ranges within which the qualification score and availability capacity score of a resource must land to be included among filtered search results, i.e., cards 60, displayed in the search results section 56. After a user has checked specific filtering criteria and/or adjusted the slider bars 88, 80, a user may apply the filtering criteria by selecting an apply button 100.

The sliders 88, 80 represent examples of slider user interface controls. For the purposes of the present discussion, a slider user interface control may be any user interface control with a graphic that can be positioned or moved to change values corresponding to positions of the graphic. A slider bar may be any movable graphic of a slider user interface control.

Pictures 76 and/or other components of the cards 60 may be hyperlinked such that selection thereof may cause display of another window or dialog box with additional details of an associated human resource. Functionality for viewing additional details of a resource associated with a card is called drill down functionality herein. Such drill down functionality may be further accessible via a user option provided via the actions drop down menu 90 or other mechanism.

Exact additional details displayed in response to selection of a hyperlinked picture, a hyperlinked name of a card, or a details item in a drop down menu, are implementation specific. Examples of additional details that may be shown include indications of knowledge areas, languages spoken, competencies or knowledge areas, salary, and so on.

Hence, the example user interface display screen 50 may be considered a resource management user interface display screen, wherein search results obtained in response to a resource request are displayed in cards 60, and wherein each card 60 has one or more graphics 64-70.

Figure 3:
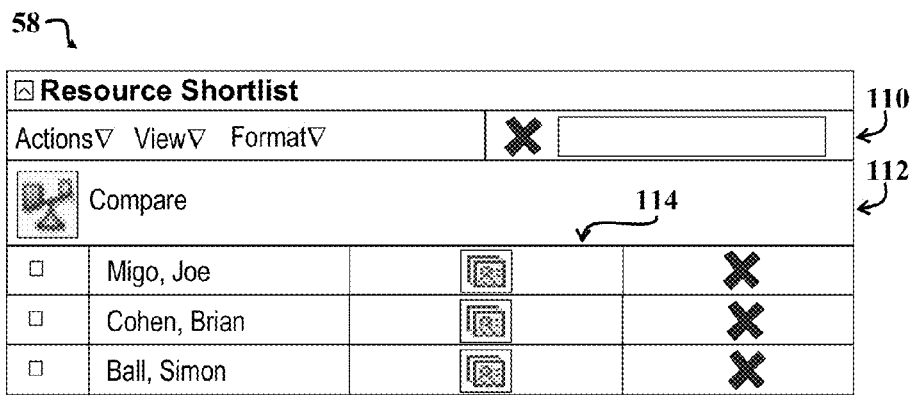
FIG. 3 is an example implementation of the shortlist of FIG. 2.

FIG. 3 is an example implementation of the shortlist 58 of FIG. 2. The example shortlist 58 includes a menu bar 110 with various menus for providing user options to perform actions, view details, and to delete and format entries of a table 114. The table 114 lists records, i.e., computing objects, corresponding to shortlisted resource search results. A toolbar 112 may provide additional user options, such as an option to compare selected resource results in the table 114.

FIG. 3 is a second example user interface display screen 120 illustrating example search results. The user interface display screen 120 is similar to the user interface display screen 50 of FIG. 2 with certain exceptions.

In particular, the cards 60 of the results section 56 have been sorted by qualification score in response to user selection of a qualification score option from a sort drop down menu of the toolbar 84. The cards 60 are ordered and presented left to right; top to bottom, in order of decreasing qualification score.

In addition, Eric Schweizer has been added to the shortlist 58, which automatically removed Eric Schweizer from the results section 56. To add Eric Schewizer to the shortlist 58, a user selects the corresponding shortlist button 72 of FIG. 2 or otherwise selects the card checkbox 76 followed by selection of the shortlist button 92 of the toolbar 84.

Furthermore, the cards 60 have been filtered by adjusting the sliders 88, 90 of the filter section 86. The available capacity slider 88 has been adjusted so that cards of resources characterized by available capacity scores less than 60% are filtered out of the results section 56. Accordingly, with reference to FIGS. 2 and 3, Satya Patil's card (as shown in FIG. 3), which was associated with an available capacity score of 55%, was removed from the results section 56 in FIG. 3.

Figure 5:
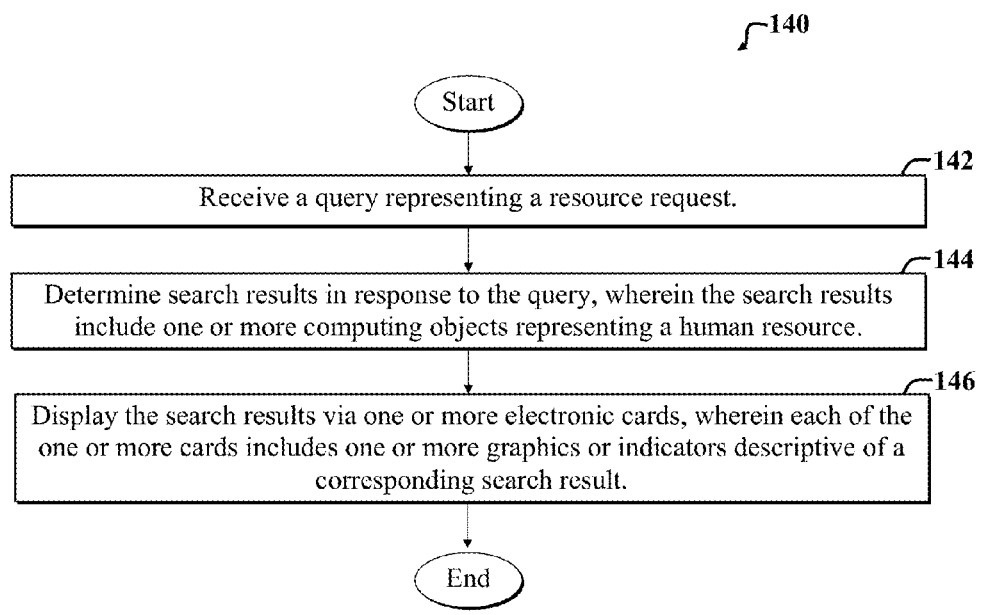
FIG. 5 is a flow diagram of a first example method adapted for use with the embodiments of FIGS. 1-4.

FIG. 5 is a flow diagram of a first example method 140 adapted for use with the embodiments of FIGS. 1-3. The example method 140 includes an initial step 142, which involves the user interface software 20 of FIG. 1 receiving a query representative of a resource request. The example query may comprise various inputs, such as requested start date, requested finish date, project name, competencies sought, location of project, and so on, as indicated in the request resource details section 54 of FIGS. 2 and 3.

A second step 144 includes determining search results in response to the query. The search results include one or more computing objects, e.g., records, representing one or more human resources.

A third step 146 includes displaying the search results via one or more electronic cards, such as the cards 60 of FIGS. 2 and 3. Each of the one or more cards includes one or more graphics, such as indicators, descriptive of a corresponding search result.

Various steps of the method 140 may be altered or augmented without departing from the scope of the present teachings. For example, additional steps, such as providing user options for sorting, filtering, assigning, and adding a card to a shortlist may be included.

Figure 6:
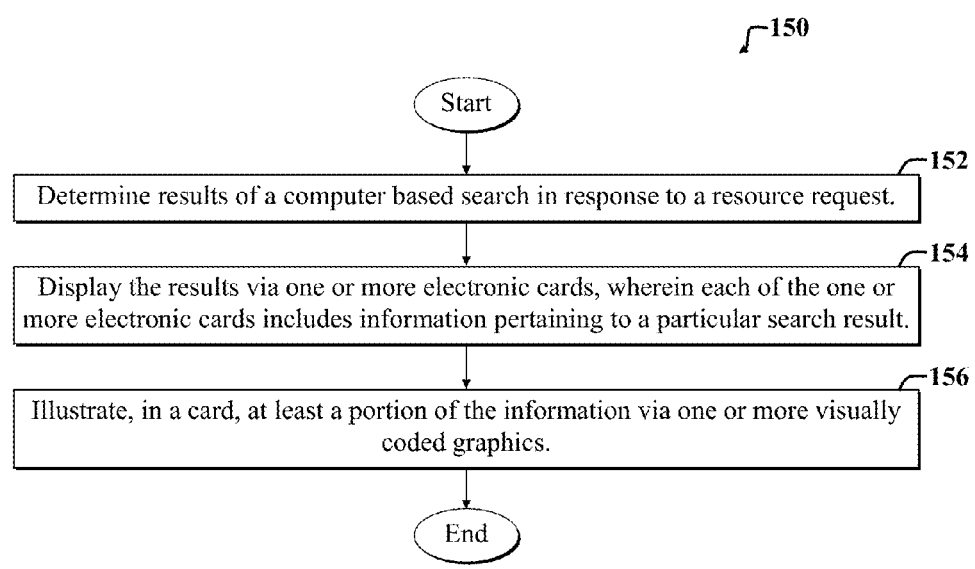
FIG. 6 is a flow diagram of a second example method adapted for use with the embodiments of FIGS. 1-4.

FIG. 6 is a flow diagram of a second example method 150 adapted for use with the embodiments of FIGS. 1-3. The second example method 150 includes an initial determining step 152, which includes determining results of a computer based search in response to a resource request.

A subsequent displaying step 154 includes displaying the results via one or more electronic cards, wherein each of the one or more electronic cards includes information pertaining to a particular search result.

A graphic illustrating step 156 includes illustrating, in a card, at least a portion of the information via one or more visually coded graphics. The visually coded graphics may include color coded indicators indicating values for various metrics, such as qualification scores and availability scores.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method, performed by one or more processors, for displaying search results in an enterprise computing environment, the method comprising:

receiving user input specifying a resource query including one or more search criteria for a project specifying availability and qualification characteristics of sought human resources;

calculating one or more metric weighting scores on retrieved human resource search results;

filtering retrieved human resource search results based on one or more filtering criteria;

sorting retrieved human resource search results based on a selected metric weighting score;

organizing filtered and sorted retrieved human resource search results and metric weighting scores into a plurality of card objects, with each card object corresponding to a retrieved human resource search result and metric weighting scores pertaining to the retrieved human resource search result; and displaying each card object in the plurality of filtered and sorted card objects in an associated region of a display area, with each card object displaying a collection of data relating to a corresponding retrieved human resource search result, displaying one or more visually coded graphical display elements representing selected metric weighting scores and displaying action graphical elements to add the corresponding retrieved human resource search result to a short list or to assign the corresponding retrieved human resource search result to the project.

2. The method of claim 1 wherein the one or more visually coded graphical display elements include color coding.

3. The method of claim 1 wherein the one or more visually coded graphical display elements include an indicator with plural sections, wherein each section corresponds to a particular time interval, and wherein each section is visually coded to indicate an availability score corresponding to the section.

4. The method of claim 1, wherein the resource request includes a request for one or more human resources, and wherein displaying filtered and sorted card objects further includes displaying a picture of the human resource.

5. The method of claim 1 wherein the one or more metric weighting scores includes an overall score, wherein the overall score incorporates values of a qualification score and an available capacity score, and wherein the one or more visually coded graphical display elements includes a visually coded graphical display element graphic indicating an overall score.

6. The method of claim 1 with filtering received human resource search results further including filtering the retrieved human resource search results by selectively dragging one or more slider bars corresponding to one or more metric weighting scores describing one or more human resources included among the one or more retrieved human resource search results.

7. The method of claim 6 with filtering received human resource search results further including specifying, via the one or more slider bars, a range of values for a metric weighting score.

8. The method of claim 7 further including not displaying filtered and sorted card objects including a metric weighting score less than a specified adjusted metric weighting score.

9. The method of claim 1 further including performing, in response to user input, an action on a card.

10. The method of claim 9 wherein the action includes adding a resource or representation thereof to a list of resources.

11. The method of claim 9 wherein the action includes comparing plural resources of the results.

12. The method of claim 1 further including selecting a user interface control of a card object to access additional details not displayed.

13. An apparatus comprising:
a digital processor coupled to a display and to a non-transitory processor readable storage device, wherein the non-transitory processor-readable storage device includes one or more instructions executable by the digital processor to perform the following acts:
receiving user input specifying a resource query including one or more search criteria for a project specifying availability and qualification characteristics of sought human resources;
calculating one or more metric weighting scores on retrieved human resource search results;
filtering retrieved human resource search results based on one or more filtering criteria;
sorting retrieved human resource search results based on a selected metric weighting score;
organizing filtered and sorted retrieved human resource search results and metric weighting scores into a plurality of card objects, with each card object corresponding to a retrieved human resource search result and metric weighting scores pertaining to the retrieved human resource search result; and
displaying each card object in the plurality of filtered and sorted card objects in an associated region of a display area, with each card object displaying a collection of data relating to a corresponding retrieved human resource search result, displaying one or more visually coded graphical display elements representing selected metric weighting scores and displaying action graphical elements to add the corresponding retrieved human resource search result to a short list or to assign the corresponding retrieved human resource search result to the project.

14. A non-transitory processor readable storage medium including instructions executable by a digital processor, the processor readable medium including one or more instructions for:
receiving user input specifying a resource query including one or more search criteria for a project specifying availability and qualification characteristics of sought human resources;
calculating one or more metric weighting scores on retrieved human resource search results;
filtering retrieved human resource search results based on one or more filtering criteria;
sorting retrieved human resource search results based on a selected metric weighting score;
organizing filtered and sorted retrieved human resource search results and metric weighting scores into a plurality of card objects, with each card object corresponding to a retrieved human resource search result and metric weighting scores pertaining to the retrieved human resource search result; and
displaying each card object in the plurality of filtered and sorted card objects in an associated region of a display area, with each card object displaying a collection of data relating to a corresponding retrieved human resource search result, displaying one or more visually coded graphical display elements representing selected metric weighting scores and displaying action graphical elements to add the corresponding retrieved human resource search result to a short list or to assign the corresponding retrieved human resource search result to the project.

* * * * *

UNITED STATES PATENT AND TRADEMARK OFFICE
CERTIFICATE OF CORRECTION

PATENT NO.       : 8,589,386 B2
APPLICATION NO.  : 13/438372
DATED            : November 19, 2013
INVENTOR(S)      : Leslie et al.

Page 1 of 1

It is certified that error appears in the above-identified patent and that said Letters Patent is hereby corrected as shown below:

In the Specification

In column 9, line 7, delete "Schewizer" and insert -- Schweizer --, therefor.

In the Claims

In column 11, line 22, in Claim 5, delete "element graphic" and insert -- element --, therefor.

Signed and Sealed this
Tenth Day of June, 2014

Michelle K. Lee
*Deputy Director of the United States Patent and Trademark Office*